United States Patent [19]
Pearson et al.

[11] Patent Number: 5,161,014
[45] Date of Patent: Nov. 3, 1992

[54] NEURAL NETWORKS AS FOR VIDEO SIGNAL PROCESSING

[75] Inventors: John C. Pearson, Lawrenceville; Clay D. Spence, Plainsboro, both of N.J.

[73] Assignee: RCA Thomson Licensing Corporation, Princeton, N.J.

[21] Appl. No.: 850,207

[22] Filed: Mar. 12, 1992

Related U.S. Application Data

[63] Continuation of Ser. No. 617,908, Nov. 26, 1990.

[51] Int. Cl.⁵ .................................... H04N 5/14
[52] U.S. Cl. .......................... 358/160; 358/140; 380/15
[58] Field of Search ............... 358/140, 160, 108, 141; 382/14, 15

[56] References Cited

U.S. PATENT DOCUMENTS

| | | | |
|---|---|---|---|
| 4,398,210 | 8/1983 | Liu et al. | 358/36 |
| 4,682,230 | 7/1987 | Perlman et al. | 358/167 |
| 4,931,868 | 6/1990 | Kadar | 358/105 |
| 4,933,978 | 6/1990 | Perlman et al. | 382/41 |
| 4,941,122 | 7/1990 | Weideman | 382/15 |
| 5,003,490 | 3/1991 | Castelaz et al. | 358/15 |
| 5,005,206 | 4/1991 | Naillon et al. | 382/15 X |

OTHER PUBLICATIONS

B. Widrow et al "Neural Nets for Adaptive Filtering and Adaptive Pattern Recognition", Computer, Mar. 1988, pp. 25-39.

R. P. Lippmann, "An Introduction to Computing with Neural Nets", IEEE ASSP Magazine, Apr. 1987, pp. 4-22.

*Primary Examiner*—Victor R. Kostak
*Attorney, Agent, or Firm*—Joseph S. Tripoli; Eric P. Herrmann; Ronald H. Kurdyla

[57] ABSTRACT

A television signal processing apparatus includes at least one neural network for processing a signal representing an image. The neural network includes a plurality of perceptrons each of which includes circuitry for weighting a plurality of delayed representations of said signal, circuitry for providing sums of weighted signals provided by said weighting circuitry, and circuitry for processing said sums with a sigmoidal transfer function. The neural network also includes circuitry for combining output signals provided by ones of said perceptrons for providing a processed signal.

25 Claims, 6 Drawing Sheets

TABLE I

| PERCEPTRON | 1 | 2 | 3 | 4 |
|---|---|---|---|---|
| OFFSET θ | -1.899 | -2.748 | -1.962 | -2.939 |
| TAP | | WEIGHTS | | |
| 1 | -1.233 | -3.505 | 5.918 | |
| 2 | -1.013 | 0.938 | 0.757 | |
| 3 | 10.138 | -3.545 | -5.714 | |
| 4 | -1.540 | 0.247 | 0.974 | |
| 5 | -0.830 | 6.791 | -6.962 | |
| 6 | -0.286 | -0.337 | 0.714 | |
| 7 | -5.370 | 1.917 | 3.296 | |
| 8 | -0.411 | -0.846 | 2.127 | |
| 9 | 1.695 | -1.741 | -0.197 | |
| 10 | | | | -0.152 |
| 11 | | | | -1.605 |
| 12 | | | | -1.369 |

FIG. 6

TABLE II

| PERCEP-TRON | 1 | 2 | 3 | 4 |
|---|---|---|---|---|
| OFFSET θ | 4.08611 | 8.32850 | 1.86852 | -4.59444 |
| TAP | | WEIGHTS | | |
| 1 | 9.37029 | 5.55776 | .70193 | -15.53874 |
| 2 | 12.96733 | 11.16961 | .99004 | -5.10023 |
| 3 | 22.65735 | 15.23225 | 2.08516 | -3.27984 |
| 4 | 16.05647 | 12.90277 | 1.51217 | |
| 5 | 32.58882 | 25.33679 | 3.83873 | |
| 6 | -21.85476 | -5.59387 | -3.10439 | |
| 7 | -28.97857 | -21.76778 | -4.07441 | |
| 8 | -36.90400 | -20.97689 | -4.27040 | |
| 9 | -30.48729 | -17.52038 | -3.48651 | |
| 10 | -58.33336 | -27.74969 | -5.42257 | |
| 11 | 12.26755 | 8.23721 | .77361 | |
| 12 | 19.99489 | 13.44491 | 1.47996 | |
| 13 | 19.12716 | 14.53711 | 1.83377 | |
| 14 | 18.21096 | 13.37707 | 1.49569 | |
| 15 | 30.02858 | 20.34600 | 2.85875 | |

FIG. 7

TABLE III A

| PERCEP-TRON OFFSET θ | 1 | 2 | 3 | 4 | 5 | 6 | 7 | 8 | 9 | 10 |
|---|---|---|---|---|---|---|---|---|---|---|
| | -2.959 | 4.112 | -0.337 | 4.490 | -0.685 | 4.490 | -2.316 | 4.915 | -0.373 | -1.674 |
| TAP | | | | | WEIGHT | | | | | |
| 1 | 0.666 | -0.262 | 0.715 | -0.530 | 0.646 | 0.801 | 1.513 | -0.373 | -0.696 | 0.251 |
| 2 | 0.646 | -0.092 | -0.292 | -0.515 | -0.109 | 0.566 | 2.128 | -0.486 | -1.487 | 0.043 |
| 3 | -1.436 | 1.735 | -2.340 | 1.640 | -1.234 | 2.392 | -0.479 | 1.734 | -1.804 | -1.263 |
| 4 | 0.772 | -0.356 | -0.054 | 0.014 | 0.675 | 0.527 | 1.668 | -0.402 | -0.761 | 0.485 |
| 5 | 0.539 | 0.061 | 0.538 | -0.554 | 0.302 | 0.567 | 1.602 | -0.602 | -0.541 | 0.391 |
| 6 | -0.781 | 0.072 | -0.205 | -0.606 | -0.369 | 0.251 | -2.009 | -0.348 | 1.340 | -0.284 |
| 7 | -1.610 | 0.363 | 0.014 | -0.284 | -0.773 | 0.420 | -2.577 | 0.350 | 1.594 | -0.388 |
| 8 | -1.094 | -0.070 | 0.697 | -0.649 | -0.186 | -0.022 | -2.766 | 0.462 | 1.879 | 0.109 |
| 9 | -1.182 | 0.121 | 0.590 | 0.033 | -0.446 | 0.393 | -3.165 | 0.574 | 1.456 | -0.653 |
| 10 | -1.058 | -0.306 | -0.418 | -1.061 | -0.470 | 0.422 | -2.013 | -0.339 | 1.086 | -0.663 |
| 11 | -1.175 | 1.061 | -1.809 | 0.923 | -0.463 | 0.490 | 0.598 | 0.809 | -1.998 | -1.154 |
| 12 | -1.260 | 0.862 | -1.162 | 1.293 | -0.525 | 0.647 | -0.142 | 1.094 | -1.189 | -0.876 |
| 13 | -1.222 | 0.945 | -0.234 | 1.144 | -0.762 | 0.555 | -0.296 | 1.003 | -0.915 | -0.685 |
| 14 | -1.504 | 0.813 | -0.929 | 1.166 | -0.993 | 0.463 | 0.020 | 0.808 | -1.901 | -0.457 |
| 15 | -1.141 | 0.970 | -1.844 | 0.976 | -0.565 | 0.635 | 0.518 | 0.481 | -1.934 | -0.727 |
| 16 | 0.895 | -0.652 | 1.129 | -0.056 | 0.651 | -1.194 | 0.415 | -0.070 | -0.462 | -0.217 |
| 17 | 1.025 | -0.861 | 0.189 | 0.231 | -0.064 | -1.093 | 0.601 | -0.270 | -0.679 | -0.015 |
| 18 | -1.896 | 1.559 | -2.063 | 1.717 | -1.242 | 1.227 | -1.581 | 1.936 | -1.262 | -1.097 |
| 19 | 0.683 | -0.394 | -0.633 | -0.196 | 0.340 | -0.692 | 1.109 | -0.249 | -0.501 | 0.476 |
| 20 | 0.398 | -0.211 | 0.538 | -0.271 | 0.196 | -0.866 | 0.997 | -0.055 | -0.471 | 0.318 |

FIG. 8

TABLE IIIB

| PERCEPTRON OFFSET θ | 1 | 2 | 3 | 4 | 5 | 6 |
|---|---|---|---|---|---|---|
| | 1.925 | 0.681 | 1.867 | 1.688 | -3.239 | -2.890 |

WEIGHTS

| TAP | 1 | 2 | 3 | 4 | 5 | 6 |
|---|---|---|---|---|---|---|
| 1 | 0.428 | -2.172 | 0.848 | -2.298 | 2.403 | -1.609 |
| 2 | -1.297 | -0.561 | -1.864 | 0.512 | -0.960 | 1.923 |
| 3 | 1.822 | -1.156 | 0.649 | -1.407 | 1.744 | -1.583 |
| 4 | -1.278 | -0.350 | -1.254 | 1.314 | -1.449 | 1.648 |
| 5 | 0.646 | -0.581 | 0.493 | -1.161 | 1.644 | -2.877 |
| 6 | -1.449 | 0.013 | -1.589 | 0.561 | -1.340 | |
| 7 | -0.281 | -2.004 | 1.834 | 0.176 | 1.990 | |
| 8 | -1.047 | -0.328 | -1.665 | 0.478 | -1.579 | |
| 9 | 2.593 | -1.256 | 0.224 | -1.382 | 1.353 | |
| 10 | 0.243 | -1.097 | -0.624 | -1.757 | 1.886 | |

NEURAL NETWORKS AS FOR VIDEO SIGNAL PROCESSING

This is a continuation of application Ser. No. 617,908, filed Nov. 26, 1990.

This invention relates to the use of neural networks in a television signal processing system.

BACKGROUND OF THE INVENTION

Typically video signal processing circuitry is designed by assuming a desired transfer function and then determining the circuit elements necessary to realize the function. For example, in designing a low pass filter certain "necessary" parameters are assumed such as bandwidth, phase linearity ripple, etc. Then with the aid of design tools the filter is synthesized and finally tested to determine whether it provides the assumed response characteristics. The problem with this approach is that the preliminary assumptions may not comport with the desired response.

A better approach is to assemble circuitry capable of a variety of responses, and then train it to produce desired output signals for a representative set of input signals. The training set must truly represent the conditions found in actual operation, and the system should be sufficiently flexible to generalize to input signals not present during training. Once the training has been accomplished, the circuit parameters may be utilized to fabricate circuitry to emulate the "trained" system.

A class of circuitry termed "neural networks" is capable of being trained to produce desired output responses to sets of input signals. A generalized description of such networks may be found in "Neural Nets for Adaptive Filtering and Adaptive Pattern Recognition" by Bernard Widrow et al., Computer, March 1988, pp. 25-39, and "An Introduction to Computing with Neural Nets" by Richard P. Lippmann, IEEE ASSP Magazine, April 1987, pp. 4-22, which are incorporated herein by reference.

Neural nets are conducive to recognizing patterns or particular signal signatures and have typically been utilized in pattern recognition application. In general neural nets have not been employed as linear signal processing elements, since the component parts (perceptrons) are inherently non-linear.

The present inventors have found that neural nets may be advantageously applied in processing of video signals, in both linear and non-linear signal paths.

SUMMARY OF THE INVENTION

The present invention is a video signal processing circuit including at least one neural network in a signal processing path. In one embodiment a neural network is implemented to detect signal defects in a composite video signal. In a second embodiment a neural network is arranged to provide interpolated signal values to be substituted for defective signal or as interstitial lines in an interlace-to-noninterlace scan converter.

DETAILED DESCRIPTION

The invention will be described in the environment of an impulse noise or signal defect detection and correction system for processing composite video signals, however it will readily be recognized that the concepts may be applied to more general video signal processing applications. The assumption is made that the video signals are in sampled data format, in binary or PCM form, and with the samples occurring at a rate $f_s$ equal to four times the color subcarrier frequency.

As used herein a neural network is a multi-layered combination of perceptrons. Each perceptron includes a summing node for summing a plurality of weighted samples, and applying an offset $\Theta$. The output of the summing node is then applied to a non-linear circuit with a sigmoidal response. The output of each perceptron, $Z_i$, is of the form $$Z_i = 1/(e^{-y_i(x)} + 1) \tag{1}$$

where $$y_i(x) = \sum_j w_{ij} x_j - \Theta_i \tag{2}$$

where $\Theta_i$ are respective offset values, $x_j$ are input samples values and $w_j$ are respective weighting values applied to respective sample inputs. Note that the range of output values $Z_i$ is between zero and one. The function $Z_i$ is generally "S" shaped and is designated herein as a sigmoidal function. An alternative sigmoidal function to equation (2) is the hyperbolic tangent, $\tanh(y_i(x)/2)$.

The perceptrons in a given layer all operate on the same set of input samples $x_i$. The perceptrons in successive layers operate on output values generated by a prior layer of perceptrons. The architecture of the network, that is the number of nodes, their interconnections and the external inputs are design choices as are the definitions of the desired output signals. The weights and offset values are determined in the laboratory in a training environment similar to the application in which the network will be implemented.

Training of neural networks is documented in the literature, however a brief explanation of network training is provided below.

For any degree of accuracy and any continuous function from $R^N$ to vectors in $R^M$ for which each component is between 0 and 1, there is a multi-layer perceptron which approximates the function to the given degree of accuracy, and in fact there is a method for constructing a two-layer perceptron to approximate a known function to a given degree of accuracy. However, part of the value of multi-layer perceptrons lies in the possibility of approximating unknown functions. This can be done if a set of examples is available, that is if one has a set of inputs from $R^N$ and for each of those inputs, a desired output from $R^M$. This set of examples does not have to reflect an actual function. There may be a probabilistic relationship between the inputs and outputs, in which case the neural net will approximate a function which gives a statistical relationship between the inputs and outputs, such as the mean output given the input, the most probable output given the input, etc. The person training the net must choose a set of examples, the so-called "training set", appropriately.

The weights and thresholds of the net are adjusted to best approximate the training set according to some measure of the error of the approximation, most commonly the mean squared error on the training set. Methods for adjusting the weights and thresholds are currently a very active area of research, but almost all methods involve gradient descent. To do this, the gradient of the network's error for each example with respect to the weights and thresholds is computed. The errors and gradients for each example can then be averaged, giving the mean error and its gradient, and one can then apply classical optimization techniques, such as one of the conjugate gradient methods. Or one can perform a crude method of gradient descent called back-propagation. In back-propagation, each weight and threshold is adjusted by simply adding to it a small constant multiplied by the negative of the derivative of the network error with respect to the weight or threshold in question. The error can be either the error for a particular example, the error averaged over some subset of the training set, or the error averaged over the whole training set. A common modification of this procedure is to compute a decaying average for each derivative, in which the average is taken over the recently computed errors, whether they are for single examples, or sets of examples. These averages are then used to adjust the weights and thresholds instead of the derivatives for the most recently computed error.

The calculation of the gradient of the network's error with respect to the weights and thresholds is simplified by the structure of the network. The function computed by the network is a composition of several functions, each of which is realized by a layer in the network. Mathematically, one simply applies the chain rule to compute the derivative of the network's error with respect to the outputs of the nodes in a layer. These derivatives are commonly called the node's errors. Consider that these derivatives are known for some layer. The chain rule then gives the derivatives of the network's error with respect to this layer's weights and thresholds, but also it is useful for calculating the derivatives of the network's error with respect to the outputs of the nodes in the previous layer. This derivative for a node in the previous layer is the sum over the current layer's nodes of the current layer node's error multiplied by the derivative of the current layer node's output with respect to the previous layer node's output.

An example of back-propogation training takes the form:

1. Compute the network's output for the current example.
2. Set the error of each node in the net to zero.
3. Set the error of each of the nodes in the output layer to the derivative of the network's error with respect to that node's output.
4. Set the current layer to the output layer.
5. For each node in the current layer, use its error to compute the derivative of the network's error with respect to this node's weights and threshold.
6. For each node in the current layer and each of its inputs, if the input is from a node in a previous layer, calculate the derivative of the current node's output with respect to the input, multiply by the current node's error, and add the result to the input node's error.
7. If there are no previous layers, the calculation is done. Otherwise, set the new current layer to the previous layer and go back to 5.

Thus the name back-propagation, since the error is propagated back from the output layer through each previous layer in order.

Figure 1:
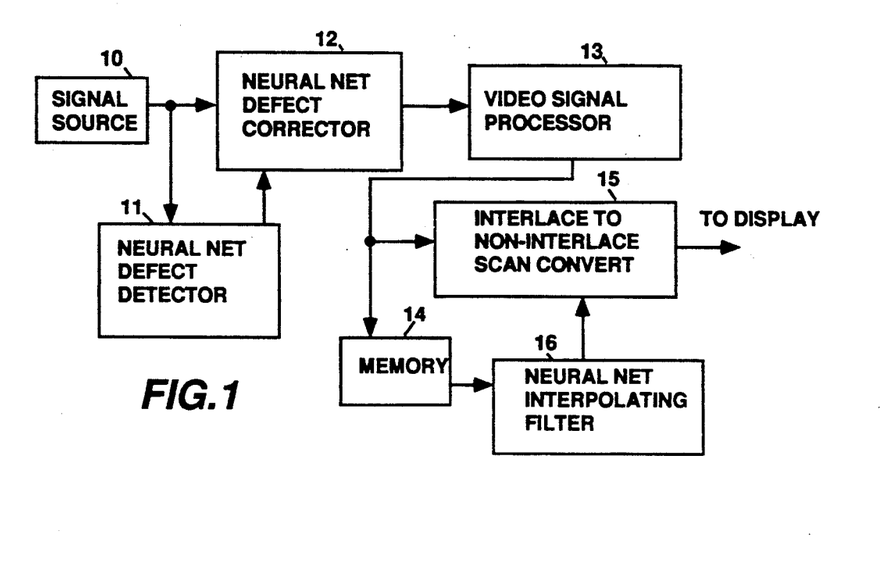
FIG. 1 is a block diagram of a television receiver including a neural network embodying the invention.

FIG. 1 shows a portion of a television signal processing system including several neural networks for performing various functions. In FIG. 1 a sampled data composite video signal is provided by a source 10. In a television receiver the source 10 may include an antenna, tuner and IF circuitry and a signal sampling circuit (e.g., an analog-to-digital converter). Alternatively, in a video disc player or a video cassette recorder, the source 10 may include a recorded medium and pickup circuitry. The signal provided by the source 10 is presumed to be susceptible of including defects such as impulse noise or signal drop outs. The signal from source 10 is coupled to a defect detector 11 and a defect corrector 12. The detector 11 generates a control signal which is applied to control the defect corrector 12.

The defect corrector 12 includes a multiplexor and an interpolator. Signal from the source 10 is applied to one input of the multiplexor and to the interpolator. Interpolated samples generated by the interpolator are coupled to a second input of the multiplexor. The multiplexor is conditioned by the control signal to pass signal from the source 10 in the absence of signal defects and to pass interpolated samples on the occurrence of signal defects. The signal provided by the multiplexor is the signal output by the defect corrector 12. Note, respective compensating delay elements may have to be included in the defect corrector to temporally align the interpolated and real signal, and the control signal with corresponding defects.

Output signal from the defect corrector 12 is applied to conventional video signal processing circuitry 13 which may include luminance/chrominance separating circuitry, chrominance demodulators, saturation-control, peaking, etc.

The luminance and chrominance signals from the processor 13 are coupled to an interlace-to-noninterlace scan converter 15 and to a memory device 14. The memory device 14 provides samples to a neural net interpolating filter 16 which generates interstitial lines of video signal. These interstitial lines of signal are also applied to the scan converter 15 wherein real lines of video signal from the processor 13 are alternated with interpolated lines of video signal from the filter 16, which alternating lines are time compressed to form a twice rate non-interlaced signal. Output signal from the scan converter is provided to a display device (not shown).

Figure 2:
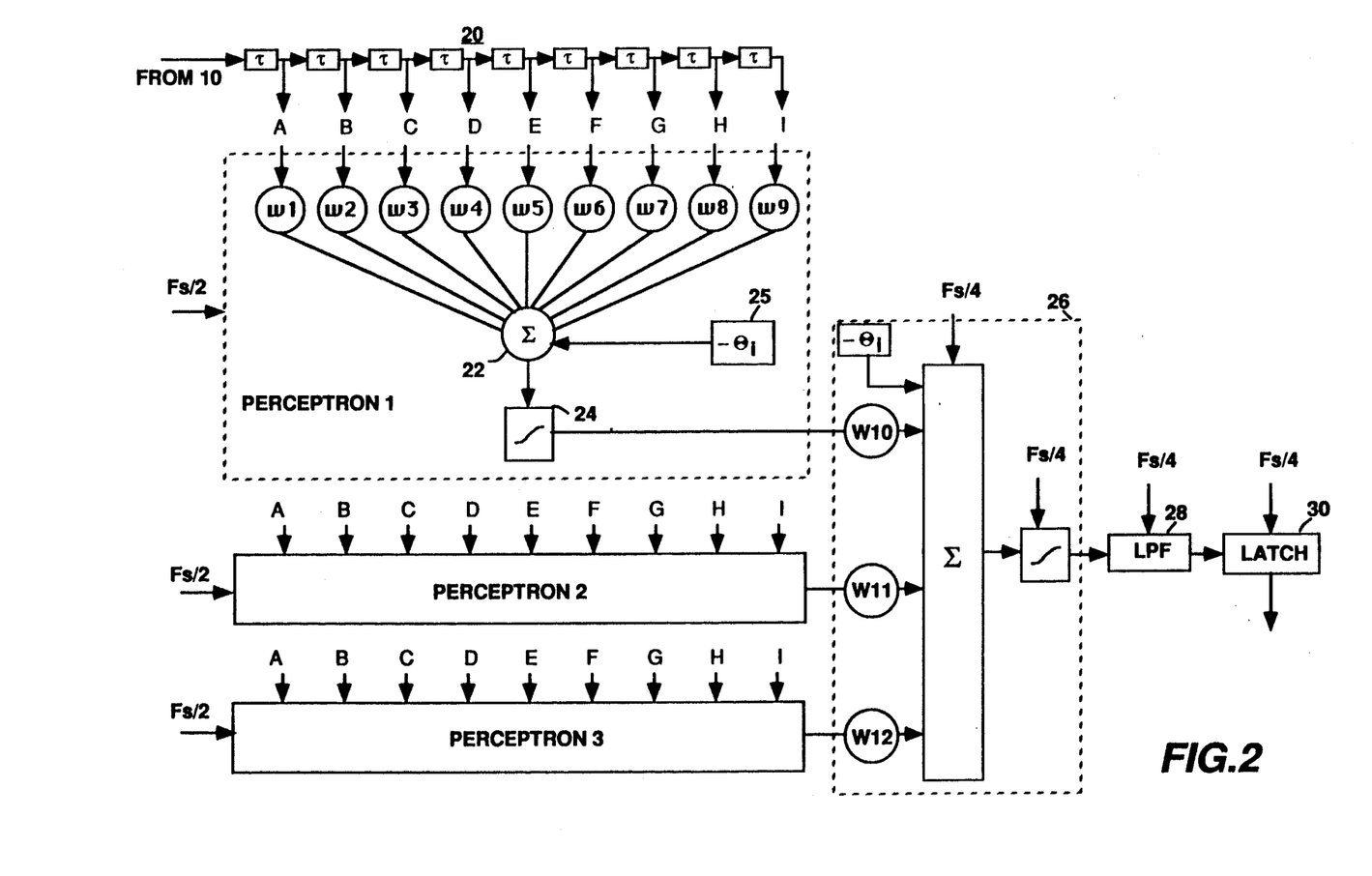
FIG. 2 is a block diagram of a neural network for passing signal components having the appearance of signal defects.
Figure 3:
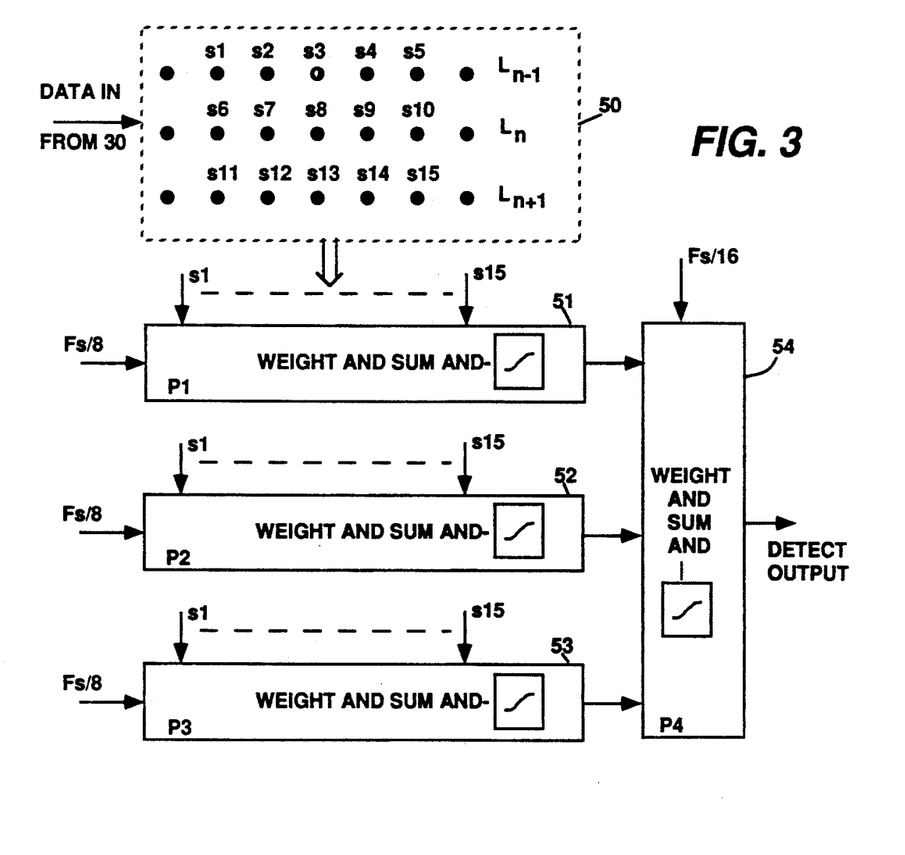
FIG. 3 is a block diagram of a neural network for performing a correlation function.

FIGS. 2 and 3 illustrate portions of the neural net defect detector 11. The neural net of FIG. 2 operates on successive groupings of samples within a video line and is trained to recognize occurrences of defect like signal occurrences. In general, the signal provided by this network is a sequence of pulses, one pulse for each defect-like occurrence.

Certain images (e.g., vertical stripes or lines) generate horizontal signal components similar to signal defects of the impulse/dropout type, which will be recognized as defects by the circuitry of FIG. 2 and generate false detection pulses. However, these horizontal signal components are normally redundant line-to-line, that is, they are spatially correlated. Defects of the impulse/dropout type are random and spatially non-correlated. The circuitry of FIG. 3 operates on a two-dimensional matrix of samples provided by the circuitry of FIG. 2, and is trained to recognize only spatially non-correlated signal defect occurrences. While the output signal from the FIG. 2 circuitry may be used directly as a defect indicating signal for controlling the defect corrector 12, inclusion of the FIG. 3 circuitry greatly reduces the potential for false defect detection.

Referring to FIG. 2, signal from the source 10 is applied to a tapped delay line 20 having output taps A-I, each tap providing successive incremental delay of for example one signal sample period. Signals from the taps are applied to three similar perceptrons (PERCEPTRON 1, PERCEPTRON 2 AND PERCEPTRON 3). In the respective perceptions the signals from the taps A-I are applied to respective weighting circuits W1-W9 wherein these respective signals are scaled by different weighting values. The weighted signals are applied to a summing circuit 22. An offset value Θ is also applied to summing circuit 22 which generates successive samples $y_i(x)$ as defined by equation (2). The $y_i(x)$ samples are coupled to a nonlinear or sigmoidal element 24 which provides perceptron output samples according to the function defined by equation (1). Element 24 will typically be realized using a read-only-memory (ROM) which is preprogrammed with the function defined by equation 1. The $y_i(x)$ values or sums are applied as address codes to the address input port of the ROM and $Z_i$ output values corresponding to the applied $y_i$ values are available at the ROM's output port.

For the defect detection application only a relatively small number of values need be stored in the ROM. That is for n-bit words $y_i$, $y_i$ can assume $2^n-1$ different values and hence $2^n-1$ different ROM addresses. When n is equal to, e.g., 6, there are 64 possible $y_i$ values. However, the number of stored values or effective addresses may be limited to a much smaller number.

Samples are continuously loaded into the delay line 20 at the sample rate $F_s$ and the three perceptrons generate output values from groupings of nine successive samples. It has been determined for the defect detection function that it is only necessary to examine every other set of nine samples. That is, if the successive samples are numbered 1-15, the respective sets of nine samples processed by the three perceptrons are samples (1-9), (3-11), (5-13), (7-15), etc. As such the three perceptrons may be arranged to operate at one half the sample rate or $F_s/2$.

Figure 5:
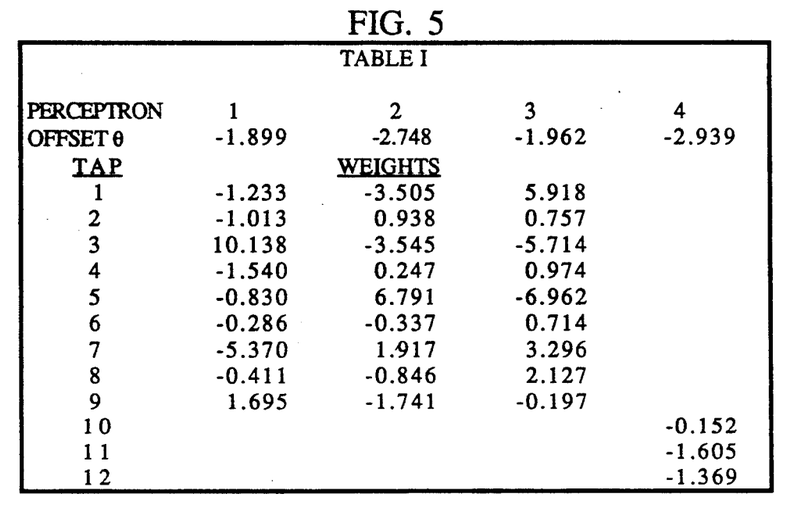
FIGS. 5-8 are tables of coefficients used in exemplary embodiments of the networks illustrated in FIGS. 2-4.

Output samples provided by PERCEPTRON 1, PERCEPTRON 2 AND PERCEPTRON 3 are coupled to a fourth perceptron 26 (PERCEPTRON 4) wherein they are respectively weighted, summed, offset and processed by the nonlinear sigmoidal element. For this application it has been found that it is sufficient to examine only every other set of samples provided by the first layer of perceptrons (PERCEPTRON 1, PERCEPTRON 2 AND PERCEPTRON 3). Thus PERCEPTRON 4 may be arranged to operate at one quarter of the input sample rate or $F_s/4$. Output samples from the fourth perceptron are lowpass filtered (28) to remove high frequency components and then latched (30) to temporally stabilize output samples. Exemplary weighting coefficients and offset values utilized in the perceptrons of FIG. 2 are listed in TABLE I wherein the taps 1-9 correspond to signals A-I respectively. The taps 10, 11 and 12 correspond to the outputs of PERCEPTRONS 1-3, respectively. The columns labeled 1-4 list the respective weights and offset values for PERCEPTRONS 1-4, respectively.

FIG. 3 illustrates a neural net for detecting non-spatially correlated pulses provided by the neural net of FIG. 2. Samples from the latch 30 are coupled to a storage device 50 which concurrently provides five samples from each of three successive horizontal lines $L_{n-1}$, $L_n$ and $L_{n+1}$. These 15 samples S1-S15 are applied to each of three perceptrons P1, P2 and P3. These perceptrons are constructed similar to the PERCEPTRON 1 of FIG. 2 except that there are 15 input signal paths with 15 weighting circuits rather than nine. It has been found that it is only necessary to examine alternate blocks of 15 samples, hence the perceptrons P1, P2 and P3 may be arranged to operate at half the sample rate of latch 30 or $F_s/8$. Output samples from the perceptrons P1, P2 and P3 are applied to a three input perceptron P4 which provides the defect control signal applied to the defect corrector 12. Perceptron P4 is also similar to the perceptron 26 of FIG. 2.

Figure 6:
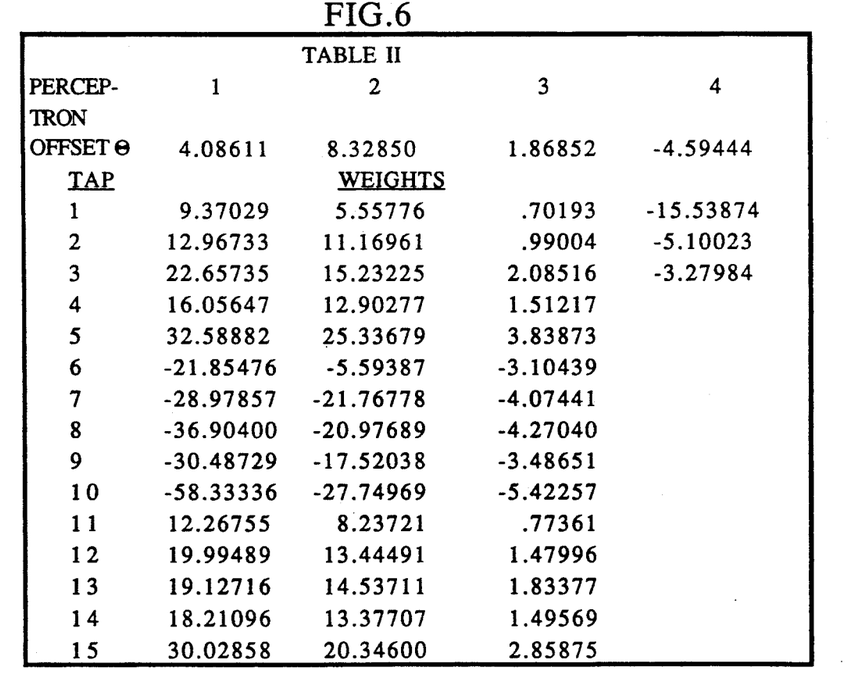
Figure 7:
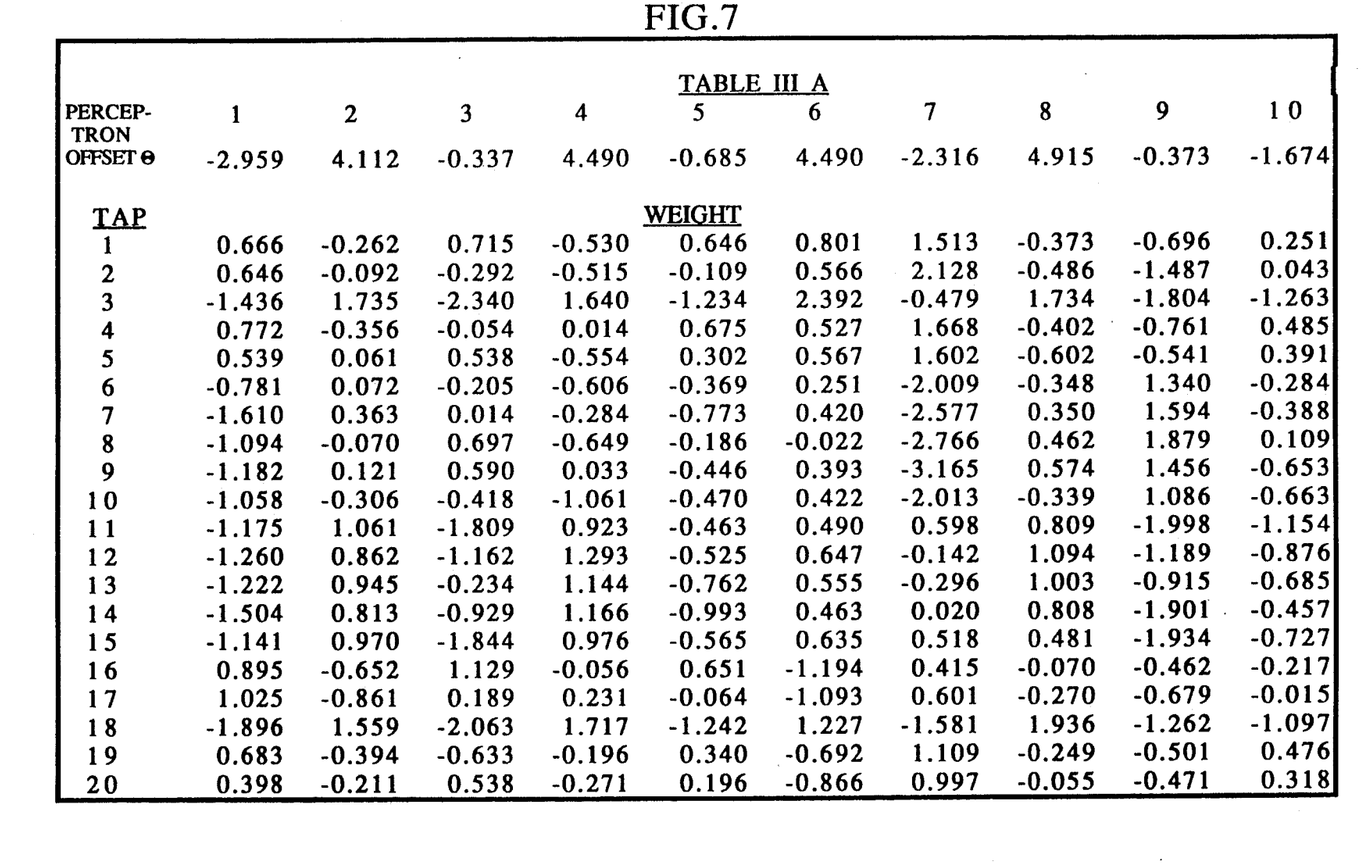
Figure 8:
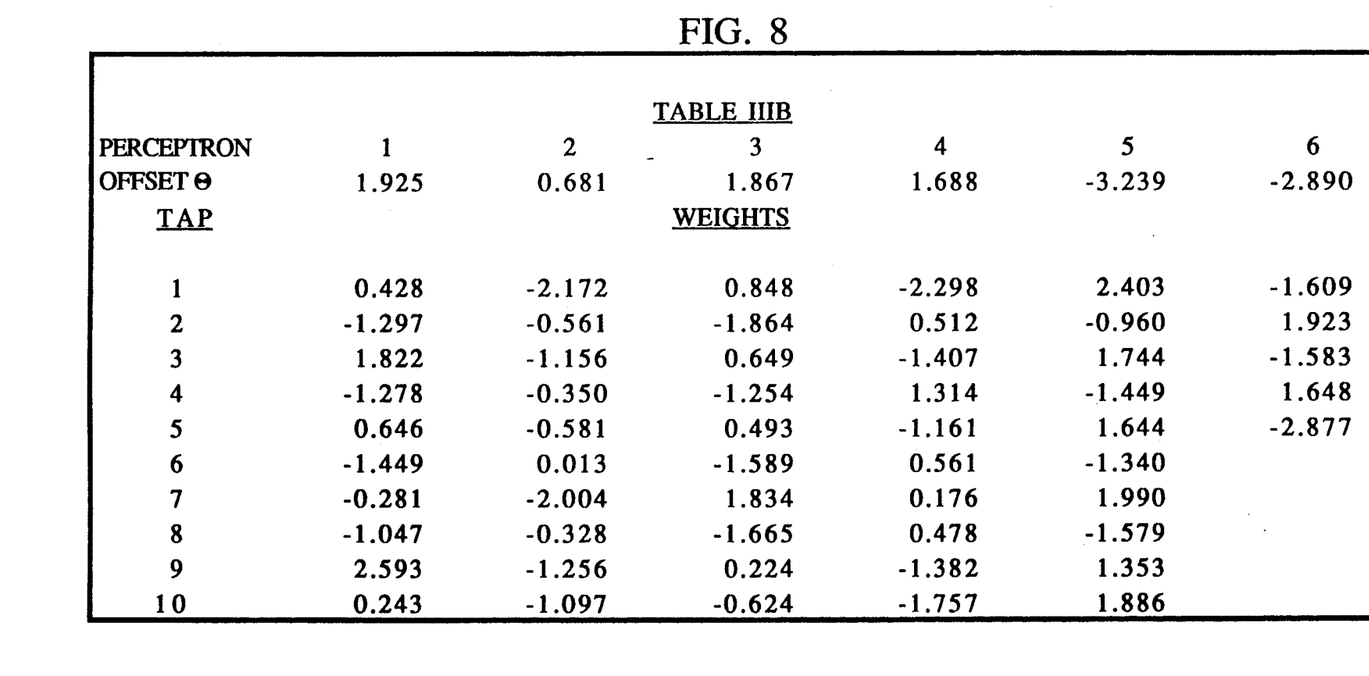

Exemplary offset values and weighting coefficients applied to the perceptrons P1-P4 are listed in TABLE II. In TABLE II the taps labeled 1-15 correspond to samples S1-S15 respectively with respect to P1-P3. Regarding P4, the taps labeled 1-3 correspond to the signals provided by the perceptrons P1-P3 respectively.

Figure 4:
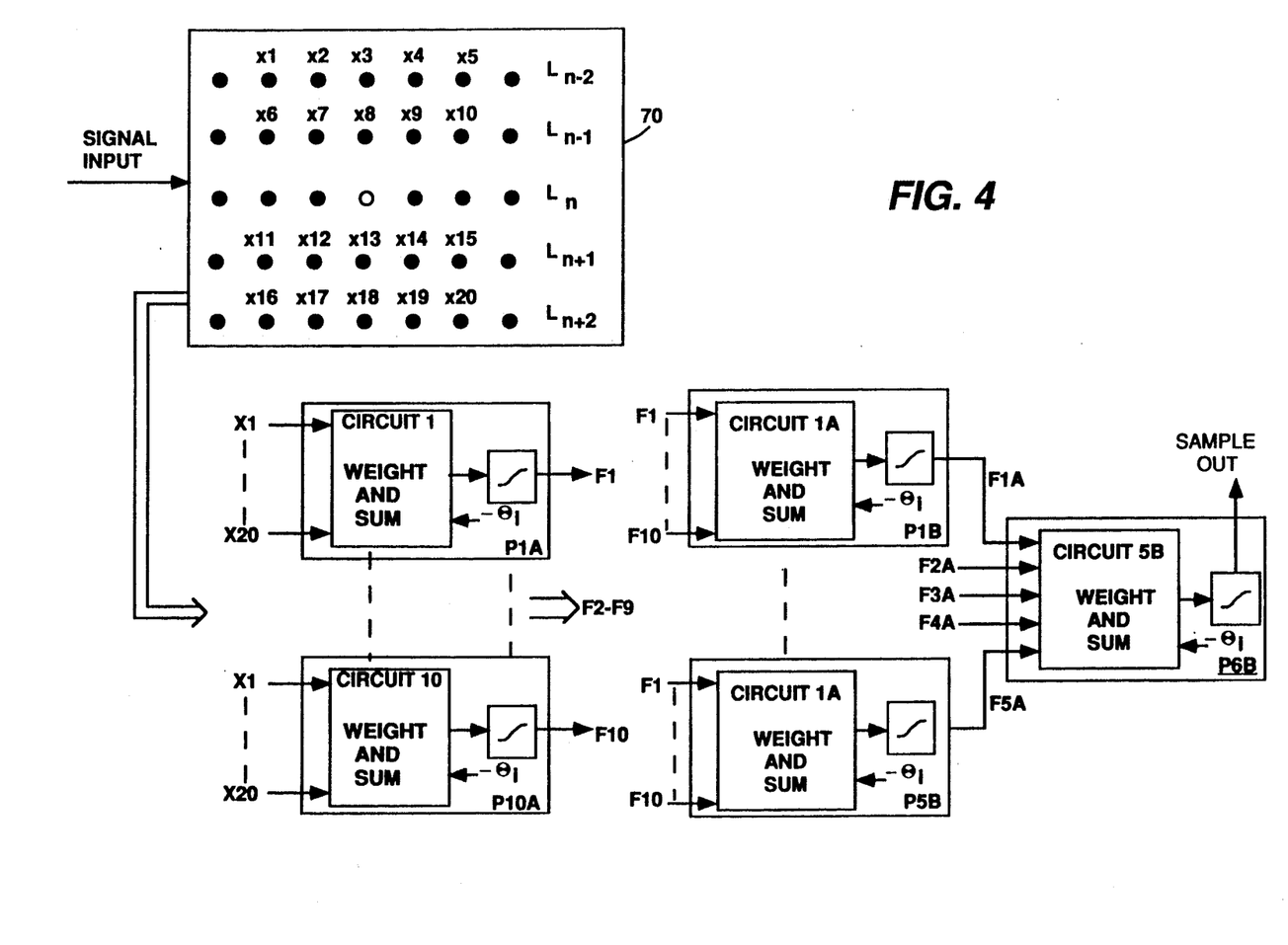
FIG. 4 is a block diagram of a neural network for performing signal interpolation.

FIG. 4 illustrates an exemplary neural net which may be implemented as the interpolator in the defect corrector 12. This particular net is configured to provide interpolated samples for a composite NTSC video signal including a chrominance component modulated in quadrature on a subcarrier which alternates in phase from horizontal line-to-horizontal line. Interpolated samples are generated at the sample rate $F_s$ from five samples from each of two lines $L_{n-2}$, $L_{n-1}$ preceding the current line $L_n$ and from five samples from each of two lines $L_{n+1}$, $L_{n+2}$ following the current line. In FIG. 4 the spatial point for which a current sample is interpolated is indicated by the open circle. The twenty samples used in the calculation are designated X1-X20.

Input samples from the signal source 10 are applied to a storage element 70 which concurrently provides the 20 samples X1-X20 from segments of four horizontal lines. These twenty samples are coupled to each of 10 perceptrons P1A-P10A. The ten output samples F1-F10 generated by the respective perceptron P1A-P10A are applied to each of five perceptrons P1B-P5B. The five output samples F1A-F5A generated by the perceptrons P1B-P5B are coupled to a five input perceptron P6B which provides the interpolated sample. Each of the perceptrons in the FIG. 4 embodiment are similar to PERCEPTRON 1 of FIG. 2 modified to accommodate the number of input signals applied respectively thereto. The offset values and weighting coefficients for the perceptrons P1A-P10A are listed in TABLE IIIA. The offset values and weighting coefficients for perceptrons P1B-P6B are listed in TABLE IIIB. In TABLE IIIA the tap numbers 1-20 correspond respectively to the samples designated X1-X20. In TABLE IIIB regarding perceptrons P1B-P5B the taps numbered 1-10 correspond to the output signals provided by the perceptrons P1A-P10A respectively. Similarly, regarding perceptron P6B the taps numbered 1-5 correspond to output signals provided by the perceptrons P1B-P5B respectively.

The interpolating neural network illustrated in FIG. 4 appears to be relatively complex, however it provides excellent substitution samples. The complexity is a consequence of the signal being composite video. Separate, simpler interpolators operating on component signals may be implemented subsequent luminance/chrominance separation. However, the overall complexity will be about the same, and due to effects of the defects on the luminance/chrominance separation circuitry, performance may be compromised.

The FIG. 4 circuitry is exemplary. Circuitry arranged to process a different matrix of samples are contemplated which include for example a neural network utilizing samples from lines $L_{n-1}$, $L_n$ and $L_{n+1}$. Regardless of the choice of the sample matrix processed either vertical or horizontal resolution will be somewhat compromised and this compromise is typically determinative of the circuitry selected for a particular application.

The neural network of FIG. 4 operates continuously and thus produces interpolated samples for every sample point in line $L_n$. As such circuitry of this type is amenable to providing interstitial lines of video signal for interlace-to-noninterlace scan conversion. For scan conversion however, the matrix illustrated in element 70 would typically represent samples of a component signal. The line $L_n$ is an interstitial line being generated. Lines $L_{n-1}$ and $L_{n+1}$ represent lines from the current field of interlaced signal and lines $L_{n-2}$ and $L_{n+2}$ may represent lines from the previous field of interlaced signal. Nominally interlace-to-noninterlace scan converters use lines from the previous field for interstitial lines except where motion exists between fields/frames. When motion is present, interpolated values, generated from samples within the current field are substituted for the interstitial line. An interpolating filter of the form shown in FIG. 4 and operating on samples from the current and previous field may be arranged for generating interstitial lines. More typically however, the neural net interpolating filter will be arranged to process samples from two adjacent lines ($L_{n-1}$, $L_{n+1}$) from the current field of interlaced video signal. Thus a corresponding neural net interpolating filter for generating interstitial lines for scan conversion may take the form of the FIG. 4 interpolator but with the number of inputs to the first layer of perceptrons (P1A-P10A) reduced to, e.g., ten (X6-X15). The weighting coefficients and offset values for the entire net will be determined by a training exercise.

What is claimed is:

1. A television signal processing apparatus including at least one neural network for processing a video signal representing an image, said neural network including a plurality of perceptrons each of which includes means for weighting a plurality of delayed representations of said video signal, means for providing sums of weighted signals provided by said weighting means, and memory means addressed by said sums and programmed at respective memory address locations with values representing a sigmoidal function of address values of the form $1/(e^{-Y}+1)$ where Y corresponds to respective sums, said neural network also including means for combining output signals provided by ones of said perceptrons for providing a processed signal, and said apparatus including utilization means responsive to said processed signal.

2. The apparatus set forth in claim 1 wherein said television signal processing apparatus is a television receiver and said neural network is an interpolating filter responsive to said video signal for generating interpolated alternative video signal samples for use in one of video signal correction apparatus and interlace-to-noninterlace scan apparatus.

3. The apparatus set forth in claim 2 wherein said neural network includes;
   delay means, responsive to said signal representing said image for concurrently providing a plurality of relatively delayed samples;
   a first layer of N perceptrons (N an integer), each of said N perceptrons responsive to said plurality of relatively delayed samples;
   at least one further perceptron responsive to signals provided by said first layer of N perceptrons, for providing said processed signal.

4. The apparatus set forth in claim 2 wherein said neural network includes;
   delay means, responsive to said signal representing said image for concurrently providing a plurality of relatively delayed samples;
   a first layer of N perceptrons (N an integer), each of said N perceptrons responsive to said plurality of relatively delayed samples;
   a second layer of M perceptrons (M an integer), each of said M perceptrons responsive to signals provided by all of said plurality of N perceptrons; and
   a third layer of Q perceptrons (Q an integer), each of said Q perceptrons responsive to signals provided by all of said plurality of M perceptrons, said third layer of perceptrons providing said processed signal.

5. The apparatus set forth in claim 1 wherein said neural network is a defect detector comprising:
   delay means, responsive to said signal representing said image for concurrently providing a plurality of relatively delayed samples;
   a first layer of N perceptrons (N an integer), each of said N perceptrons responsive to said plurality of relatively delayed samples;
   at least one further perceptron responsive to signals provided by said first layer of N perceptrons, for providing said processed signal.

6. The apparatus set forth in claim 1 wherein said neural network is a defect detector comprising:
   delay means, responsive to said signal representing said image for concurrently providing a plurality of relatively delayed samples;
   a first layer of N perceptrons (N an integer), each of said N perceptrons responsive to said plurality of relatively delayed samples;
   at least one further perceptron responsive to signals provided by said first layer of N perceptrons, for providing an intermediate processed signal;
   further delay means, responsive to said intermediate processed signal for concurrently providing a plurality of relatively delayed samples representing said intermediate processed signal;
   a first layer of M perceptrons (M an integer), each of said M perceptrons responsive to said plurality of relatively delayed samples representing said intermediate processed signal;
   at least one further perceptron responsive to signals provided by said first layer of M perceptrons, for providing said processed signal.

7. The apparatus set forth in claim 4 wherein at least one successive layer of perceptrons is conditioned to operate at a lesser rate than a prior layer of perceptrons.

8. The apparatus set forth in claim 5 wherein said further delay means is coupled to said at least one further perceptron by a low pass filter.

9. A television signal processing apparatus including a detector for detecting defects in recovered video signals, said detector comprising a neural network responsive to recovered video signal, said neural network including a first plurality of perceptrons arranged to be operative on said video signal in one dimension (e.g. horizontal); means for combining signals provided by said first plurality of perceptrons to provide an intermediate signal; a second plurality of perceptrons arranged to be operative on said intermediate signal in two dimensions (e.g. horizontal and vertical); and means for combining signals provided by said second plurality of perceptrons to form a signl indicative of video signal defects.

10. The apparatus set forth in claim 9 wherein said video signal occurs as samples at a predetermined sample rate; said first plurality of perceptrons provide processed signals at a rate proportional to said predetermined rate; and said neural network further includes a low pass filter for filtering said intermediate signal before application to said second plurality of perceptrons.

11. The apparatus set forth in claim 10 including means for conditioning said second plurality of perceptrons to provide processed signal at a lesser rate than said first plurality of perceptrons.

12. The apparatus set forth in claim 10 wherein said first plurality of perceptrons are arranged to simultaneously operate on a group of N samples, and wherein the first sample of each successive group of N samples is displaced at least two sample intervals from the first sample of the previous group of N samples (N an integer).

13. The apparatus set forth in claim 9 further including a second neural network responsive to said video signal for providing interpolated video signal; and means responsive to said signal indicative of video signal defects for substituting said interpolated video signal for defects in said video signal.

14. A television signal processing apparatus including a neural network for processing recovered video signals, said neural network including a first plurality of perceptrons arranged to be operative on said video signal in one dimension (e.g., horizontal); a second plurality of perceptrons arranged to be operative on subsampled signals provided by said first plurality of perceptrons and operative on signal in two dimensions (e.g., horizontal and vertical); and means for combining signals provided by said second plurality of perceptrons to form a processed video signal.

15. The apparatus set forth in claim 14 wherein said first plurality of perceptrons are arranged to simultaneously operate on a group of N samples, and wherein the first sample of each successive group of N samples is displaced at least two sample intervals from the first sample of the previous group of N samples (N an integer).

16. The apparatus set forth in claim 14 wherein said neural network includes a further perception for combing signals from said first plurality of perceptions.

17. The apparatus set forth in claim 16 further including a low pass filter coupled between said further perception and said second plurality of perceptions.

18. The receiver set forth in claim 17 characterized in that said neural network is an interpolating filter for generating interpolated video signal sample values.

19. A television signal processing apparatus including a neural network for processing recovered video signals, said neural network including a first plurality of perceptrons arranged to provide an intermediate signal; a low pass filter for low pass filtering said intermediate signal; a second plurality of perceptrons arranged to process lowpass filtered said intermediate signal and means for combining signals provided by said second plurality of perceptrons to form a processed video signal.

20. The apparatus set forth in claim 19 wherein said video signal occurs as samples at a predetermined sample rate; said first plurality of perceptrons process samples at said predetermined rate; and said second plurality of perceptrons process samples at a rate lower than said predetermined rate.

21. The apparatus set forth in claim 19 wherein said first plurality of perceptrons are arranged to simultaneously operate on a group of N samples, and wherein the first sample of each successive group of N samples is displaced at least two sample intervals from the first sample of the previous group of N samples (N an integer).

22. The receiver set forth in claim 19 wherein said first plurality of perceptrons is arranged to process said video signal in one dimension (e.g., horizontal) and said second plurality of perceptrons is arranged to process samples provided by said lowpass filter in two dimensions (e.g., horizontal and vertical).

23. The receiver set forth in claim 19 wherein each of said perceptrons of said first plurality includes means for weighting a plurality of delayed representations of said received video signal, means for providing sums of weighted signals provided by said weighting means, and means for processing said sums with a sigmoidal transfer function.

24. The receiver set forth in claim 19 characterized in that said neural network is an interpolating filter for generating interpolated video signal sample values.

25. The apparatus set forth in claim 17 wherein said neural network includes a further perception for combing signals from said first plurality of perceptions.

* * * * *